US011062198B2

(12) United States Patent
Barkan et al.

(10) Patent No.: US 11,062,198 B2
(45) Date of Patent: Jul. 13, 2021

(54) FEATURE VECTOR BASED RECOMMENDER SYSTEM

(71) Applicant: Microsoft Technology Licensing, LLC, Redmond, WA (US)

(72) Inventors: Oren Barkan, Tel Aviv (IL); Noam Koenigstein, Ra'anana (IL); Eylon Yogev, Tel Aviv (IL); Nir Nice, Kfar Veradim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 15/339,434

(22) Filed: Oct. 31, 2016

(65) Prior Publication Data

US 2018/0121798 A1    May 3, 2018

(51) Int. Cl.
| | |
|---|---|
| *G06F 16/00* | (2019.01) |
| *G06N 3/04* | (2006.01) |
| *G06F 40/30* | (2020.01) |

(52) U.S. Cl.
CPC ........... *G06N 3/0454* (2013.01); *G06F 16/00* (2019.01); *G06F 40/30* (2020.01)

(58) Field of Classification Search
CPC ............. G06Q 30/0631; G06Q 10/101; G06N 3/0454; G06N 3/04; G06N 20/00; G06N 3/02; G06F 16/00; G06F 40/30; G06F 3/0482
See application file for complete search history.

(56) References Cited

U.S. PATENT DOCUMENTS

| | | | |
|---|---|---|---|
| 8,886,540 B2 | 11/2014 | Cerra et al. | |
| 9,589,237 B1* | 3/2017 | Qamar | G06F 16/245 |
| 10,055,489 B2* | 8/2018 | Haviv | G06Q 30/0631 |
| 2008/0097821 A1* | 4/2008 | Chickering | G06Q 30/02 |
| | | | 705/7.29 |
| 2012/0197751 A1* | 8/2012 | Zatkin | G06F 16/2465 |
| | | | 705/26.7 |
| 2013/0097052 A1 | 4/2013 | Dicker et al. | |
| 2013/0159243 A1* | 6/2013 | Wei | H04N 21/26258 |
| | | | 706/54 |
| 2013/0211950 A1 | 8/2013 | Nice et al. | |
| 2014/0130076 A1 | 5/2014 | Moore et al. | |
| 2015/0052003 A1* | 2/2015 | Tang | G06Q 30/0631 |
| | | | 705/26.7 |

(Continued)

FOREIGN PATENT DOCUMENTS

| | | |
|---|---|---|
| CN | 104834686 A | 8/2015 |
| WO | 2013070624 A1 | 5/2013 |

OTHER PUBLICATIONS

Koren, et al., "Matrix Factorization Techniques for Recommender Systems", In Journal of Computer, vol. 42, Issue 8, Aug. 2009, pp. 42-49. (Year: 2009).*

(Continued)

*Primary Examiner* — Li Wu Chang

(57) ABSTRACT

A recommender system that represents items in a catalog by first feature vectors in a first vector space based on first characteristics of the items and second feature vectors in a second vector space based on second characteristics of the items different from the first characteristics and maps a feature vector defined in the first vector space for an item to a vector in the second vector space to provide recommendations based on the item.

20 Claims, 3 Drawing Sheets

(56) References Cited

U.S. PATENT DOCUMENTS

| | | | |
|---|---|---|---|
| 2015/0095017 A1* | 4/2015 | Mnih | G06F 40/242 704/9 |
| 2015/0178265 A1* | 6/2015 | Anderson | G06F 16/951 704/9 |
| 2015/0220836 A1* | 8/2015 | Wilson | G06Q 30/0631 706/46 |
| 2015/0363688 A1 | 12/2015 | Gao et al. | |
| 2016/0078520 A1 | 3/2016 | Nice et al. | |
| 2016/0112761 A1* | 4/2016 | Venkataraman | H04N 21/4668 725/14 |
| 2016/0132601 A1 | 5/2016 | Nice et al. | |
| 2016/0196580 A1* | 7/2016 | Hong | G06Q 30/0255 705/14.53 |
| 2016/0267377 A1* | 9/2016 | Pan | G06Q 30/0201 |
| 2017/0132509 A1* | 5/2017 | Li | G06Q 30/0631 |
| 2018/0068371 A1* | 3/2018 | Krishnamurthy | G06Q 30/0631 |
| 2019/0329364 A1* | 10/2019 | Billings | B23K 9/173 |

OTHER PUBLICATIONS

Kalchbrenner, et al., A Convolutional Neural Network for Modeling Sentences, Proceedings of 52nd Annual Meeting of the Association of Computational Linguistics, Jun. 2014, pp. 655-665. (Year: 2014).*

Krizhevsky, et al., "ImageNet Classification with Deep Convolutional Neural Networks", In Proceedings of Advances in neural information processing systems, Dec. 3, 2012, pp. 1-9.

Graves, et al., "Speech recognition with deep recurrent neural networks", In Proceedings of IEEE International Conference on Acoustics, Speech and Signal Processing, May 26, 2013, 5 pages.

Bengio, et al., "A Neural Probabilistic Language Model", In Journal of Machine Learning Research, vol. 3, Feb. 2003, pp. 1137-1155.

Yih, et al., "Learning Discriminative Projections for Text Similarity Measures", In Proceedings of the Fifteenth Conference on Computational Natural Language Learning, Jun. 23, 2011, 10 pages.

Mikolov, et al., "Distributed Representations of Words and Phrases and their Compositionality", In Proceedings of Advances in Neural Information Processing Systems, Dec. 5, 2013, pp. 1-9.

Collobert, et al., "Natural Language Processing (Almost) from Scratch", In Journal of Machine Learning Research, vol. 12, Aug. 2011, pp. 2493-2537.

Kim, Yoon, "Convolutional Neural Networks for Sentence Classification", In Proceedings of the Conference on Empirical Methods in Natural Language Processing, Oct. 25, 2014, pp. 1746-1751.

Koren, et al., "Matrix Factorization Techniques for Recommender Systems", In Journal of Computer, vol. 42, Issue 8, Aug. 2009, pp. 42-49.

Bennett, et al., "The Netflix Prize", In Proceedings of KDD Cup and Workshop, Aug. 12, 2007, 4 pages.

Bell, et al., "Lessons from the Netflix prize challenge", In Journal of ACM SIGKDD Explorations Newsletter, vol. 9 Issue 2, Dec. 2007, pp. 75-79.

Dror, et al., "The Yahoo! Music Dataset and KDD-Cup'11", In Proceedings of KDD-Cup, Aug. 21, 2011, pp. 3-18.

Barkan, et al., "Item2Vec: Neural item embedding for collaborative filtering", In the Journal of Computing Research Repository, Mar. 2016, pp. 1-8.

Maaten, et al., "Visualizing Data using t-SNE", In Journal of Machine Learning Research, vol. 9, Nov. 2008, pp. 2579-2605.

Chelba, et al., "One billion word benchmark for measuring progress in statistical language modeling", In the Journal of Computing Research Repository, Dec. 2013, 6 pages.

Csurka, et al., "Visual categorization with bags of keypoints", In Proceedings of Workshop on statistical learning in computer vision, vol. 1, No. 1-22, May 2004, 16 pages.

Ramos, Juan, "Using tf-idf to determine word relevance in document queries", In Proceedings of the first instructional conference on machine learning, Dec. 2003, 4 pages.

Kingma, et al., "Adam: A method for stochastic optimization", In the Journal of Computing Research Repository, Dec. 2014, pp. 1-15.

Harper, et al., "The MovieLens Datasets: History and Context", In Journal of ACM Transactions on Interactive Intelligent Systems, vol. 5, No. 4, Dec. 2015, 19 pages.

Prechelt, Lutz, "Automatic Early Stopping Using Cross Validation: Quantifying the Criteria", In Journal of Neural Networks, vol. 11, Issue 4, Jun. 1998, pp. 1-12.

* cited by examiner

FEATURE VECTOR BASED RECOMMENDER SYSTEM

BACKGROUND

Modern communication networks, such as mobile phone networks and the Internet, and the plethora of devices that provide access to services that they provide have not only made people intensely aware of each other, but have inundated them with a surfeit of information and options for satisfying any from the simplest to the most complex needs and desires. All too often, the information is overwhelmingly abundant and diluted with irrelevant information.

Various recommender systems and algorithms have been developed to attempt to deal with the challenges and opportunities that the abundance of information has generated, and to automatically focus and filter information to match an interest and/or need of a business, organization, or person, generically referred to as a person. Common recommender algorithms for automatically inferring and recommending items that a person might be interested in are algorithms referred to as "collaborative filtering" (CF) and "content-based filtering" (CB) algorithms. A recommender system using a CF algorithm recommends an item to an individual if persons sharing a commonality of preferences with the individual have exhibited a preference for the item. For example, if the individual has shown a preference for item "A" in the past, and persons in the database who have shown preference for item A have also shown preference for an item "B", then item B may preferentially be recommended to the individual. In accordance with a CB algorithm, a recommender system recommends an item to an individual if the item shares a similarity with items previously preferred by the individual. For example, if the individual has shown a preference for action movies, the algorithm may preferentially recommend an action movie to the individual.

SUMMARY

An aspect of an embodiment of the disclosure, relates to providing a recommender system that represents items in a catalog of items by respective first feature vectors in a first vector space and respective second feature vectors in a second vector space. The first feature vectors are configured to encode data responsive to a first set of characteristics of the catalog items. The second feature vectors are configured to encode data responsive to a second, different set of characteristics of the catalog items. The recommender system, optionally referred to as a "Janus recommender" or simply "Janus", may use a neural network, which may be referred to as a "MapNet neural network" or simply "Map-Net", to map feature vectors from the first vector space to feature vectors in the second vector space. Janus may use feature vectors in the second space that are mapped by MapNet from the first vector space to recommend an item from the catalog of items to a user of Janus. The feature vectors in the first and second vector spaces may be referred to as respectively providing first and second perspectives of the items in the catalog and may be used to recommend items from, or items that may be included in, the catalog based respectively on the first and second perspectives. Feature vectors in the second vector space that are mapped by MapNet from first feature vectors include attributes based on both the first and second perspectives and may be used to recommend items from the catalog, or items that may be included in the catalog, based on both the first and second perspectives.

First feature vectors may be referred to as source vectors (SRC vectors) and the first vector space as a source vector space, and second feature vectors and the second vector space may be referred to as target vectors (TGT vectors) and a target vector space respectively. A given vector space may be referred to as a SRC or TGT vector space and vectors in the given vector space as SRC or TGT vectors depending upon how the given vector space is related to another vector space. The given vector space may be a SRC vector space if MapNet maps vectors from the given vector space to the other vector space. The same given vector space may be a TGT vector space if MapNet maps vectors from the other vector space to the given vector space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
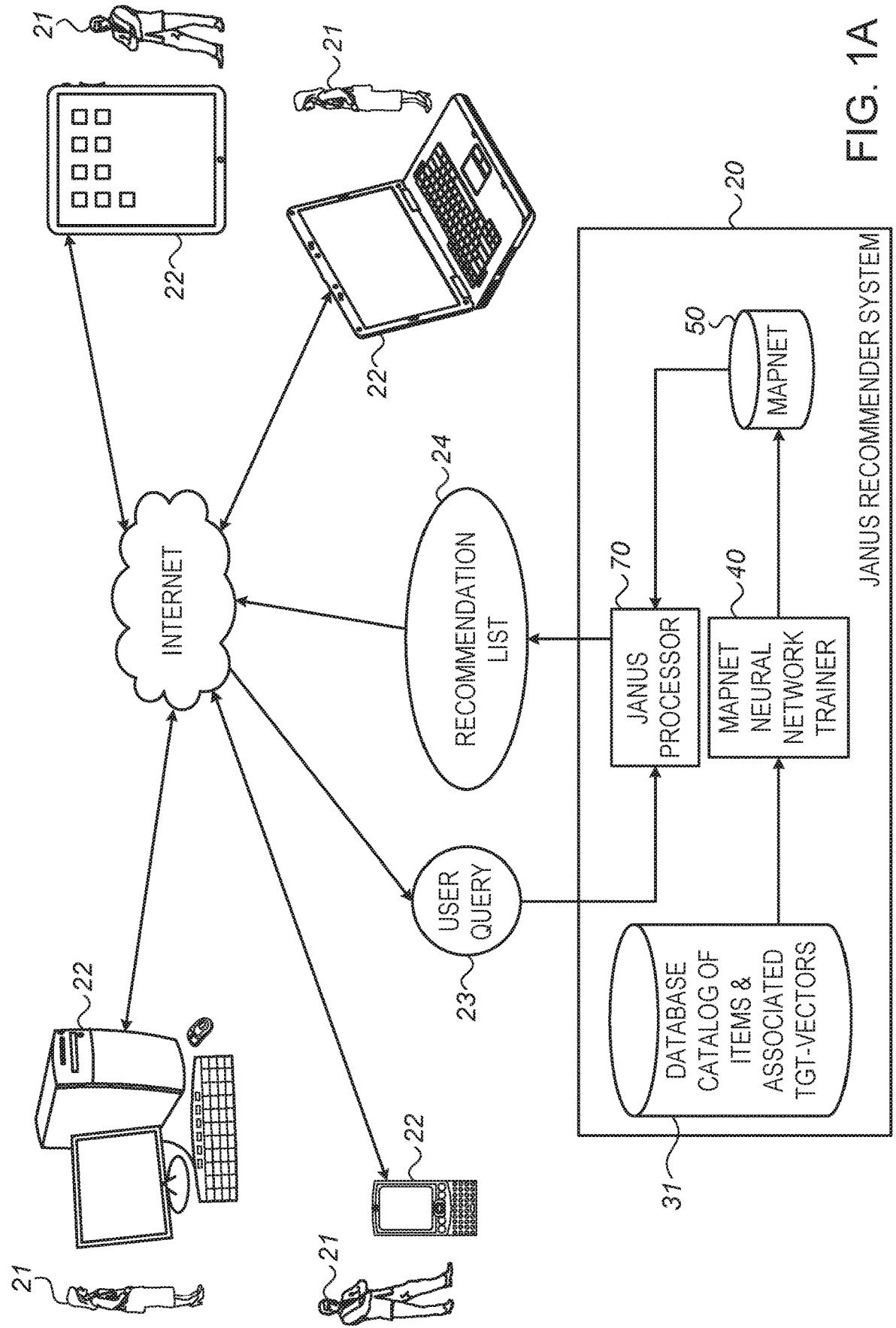
FIG. 1A schematically shows a Janus recommender system operating to provide recommendations to users, in accordance with an embodiment of the disclosure.
Figure 1B:
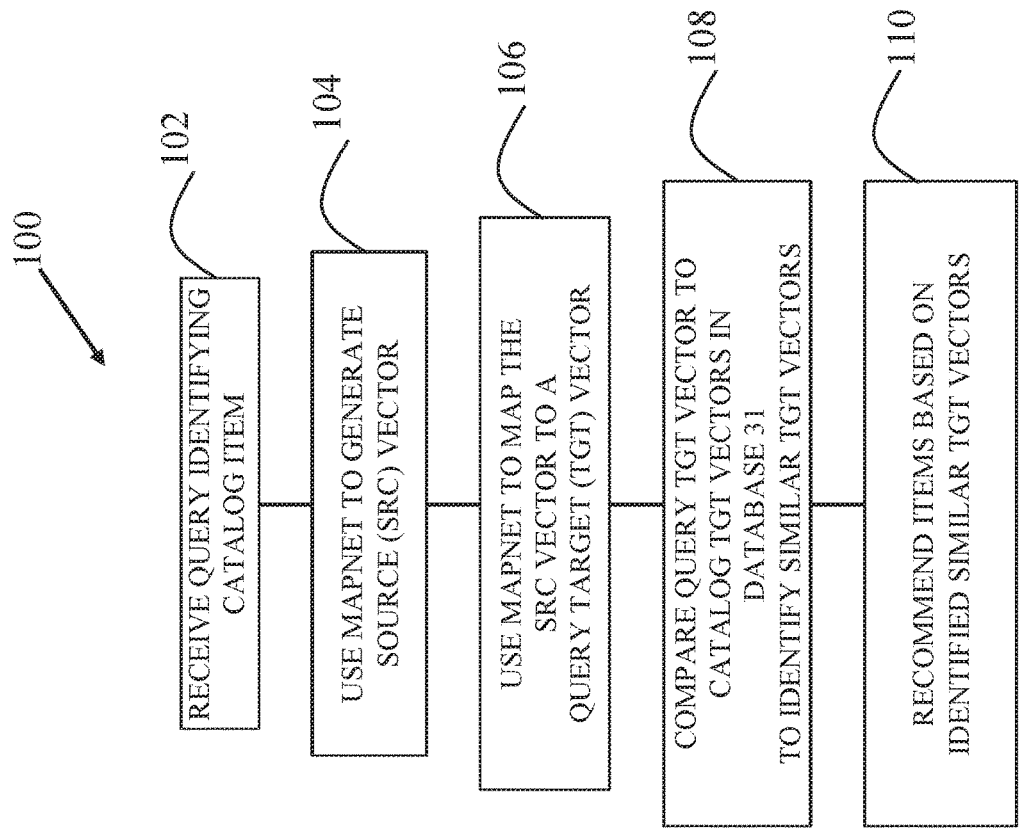
FIG. 1B shows a high-level flow diagram illustrating operation of the Janus recommender shown in FIG. 1A to provide user recommendations in accordance with an embodiment of the disclosure.

In the detailed discussion below a Janus recommender system in accordance with an embodiment of the disclosure is discussed with reference to FIGS. 1A and 1B. FIG. 1A schematically shows a configuration of components of the Janus recommender system that cooperate to support functioning of the recommender system. FIG. 1B shows a high-level flow diagram that illustrates operation of the Janus shown in FIG. 1A and use of a MapNet by Janus to generate a recommendation for a user in reply to a user query. FIG. 2A shows a schematic configuration of a "movie MapNet" neural network, which may be used to recommend movies to a user of Janus in accordance with an embodiment of the disclosure. The MapNet shown in FIG. 2A comprises a module that processes descriptive text of movie plots as bags of words (BOW) to recommend movies to users. A CNN module for processing plot descriptive texts of movies that may be used by a MapNet in accordance with an embodiment to provide recommendations to users is discussed with reference to FIG. 2B.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

FIG. 1 schematically shows a Janus recommender system 20 operating to provide recommendations to users 21 that may access Janus 20 using any of various stationary or mobile communication devices, such as by way of example, a smartphone, laptop, notebook, or desktop computer. A numeral 22 generically labels all the communication devices. Access to Janus 20 may be via any suitable communication network to which the communication devices may connect, such as the Internet, a mobile phone network, or local area network (LAN). For convenience of presentation, the communication devices are schematically shown as communicating with Janus 20 via the Internet.

Janus 20 optionally comprises or has access to a database 31 that is stored in a suitable memory and has data that identifies catalog items that may be recommended to users of Janus 20, a MapNet neural network trainer 40, a MapNet 50, and a Janus processor 70. Database 31 may comprise data for each catalog item that characterizes the item and may be used to generate a source, SRC, vector in a SRC vector space for each catalog item. The database may also comprise a vector that is a surrogate for the catalog item, which may function as a target, TGT, vector in a TGT vector space for the item. MapNet neural network trainer 40 may process target TGT vectors of catalog items in database 31 and data characterizing the catalog items to train MapNet 50 to generate a SRC vector for each of the catalog items and map the SRC vector to the respective TGT vector of the catalog item. Janus processor 70 is configured to receive a transmission, which may be in the form of a query 23, from a user 21 identifying a catalog item or an item that shares sufficient features with catalog items so that it may reasonably be included in database 31, and use MapNet 50 to process the query to provide a recommendation 24 to the user based on the item identified in the query.

Janus recommender system 20 may comprise any electronic and/or optical processing and/or control circuitry, to provide and enable functionalities that Janus 20 may require to support its operation in embodiments that are described below and embodiments similar to the described embodiments. By way of example, Janus processor 70 may comprise any one, or any combination of more than one of, a microprocessor, an application specific circuit (ASIC), field programmable array (FPGA) and/or system on a chip (SOC). And a memory in which database 31 is at least partially stored may comprise any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). Components of Janus 20 may comprise real, physical, and/or virtual components, and may be distributed components or locally centralized components. Janus 20 may, at least in part, be cloud based.

FIG. 1B shows a flow diagram of a procedure 100 that Janus recommender system 20 executes to provide recommendations to a user 21. In a block 102 Janus 20 receives a query from a user 21 that identifies a catalog item in database 31 or an item that shares sufficient features with catalog items in database 31 so that it may reasonably be included in the database. An item that is not, but reasonably may be included in database 31 is an item for which MapNet 50 may determine a target, TGT, vector in a TGT vector space defined for items included in the database. Hereinafter, a catalog item or an item that may reasonably be included in database 31 may generically be referred to as a catalog item and a catalog item identified in a query may be referred to as a query item.

In a block 104 processor 70 optionally uses MapNet 50 to generate a SRC vector for the query item based on data, also referred to as input data, characterizing the query item that is available in database 31, in the query, and/or that may be available from another database accessible by Janus, for example, via the Internet. In a block 106 processor 70 may use MapNet 50 to map the SRC vector determined for the query item to a vector, hereinafter also referred to as a query TGT vector, in the TGT vector space in which the catalog TGT vectors in database 31 are defined. In a block 108, processor 70 compares the query TGT vector to TGT vectors stored in database 31 to identify a TGT vector or TGT vectors in the database that may be considered sufficiently similar to the query TGT vector so that they may be used to recommend the items they represent to the user. Optionally, processor 70 uses a nearest neighbor algorithm to identify TGT vectors in database 31 that are similar to the query TGT vector. In an embodiment, processor 70 uses magnitudes of scalar products between the query TGT vector and catalog TGT vectors, and an appropriate scalar product threshold for the magnitudes to identify catalog TGT vectors similar to the query TGT vector. In a block 110, processor 70 recommends a catalog item or catalog items from database 31 based on the identified similar TGT vector or vectors. In FIG. 1 Janus 20 is schematically shown providing the user 21 who transmitted query 23 to Janus 20 with a recommendation list 24 comprising at least one catalog item included in database 31.

In an embodiment, the SRC feature vectors may be CB-SRC feature vectors that encode CB data, which is data responsive to content based features of the catalog items that define and/or characterize the items, and may be used to provide CB recommendations to a Janus user. The TGT vectors in database 31 may be CF-TGT feature vectors that encode CF data responsive to frequencies with which items in the catalog are mutually associated and may be used to provide CF, CF recommendations to a user of the catalog. Janus 20 may use MapNet 50 to map CB-SRC vectors to CF-TGT vectors to recommend items to users based on both CB and CF perspectives of the items.

The CF-TGT vectors in database 31 may be generated by any suitable algorithm that provides CF vectors for catalog items based on frequencies of association of the catalog items. For example, the CF-TGT vectors may be generated by a matrix factorization (MF) algorithm operating on a ranking matrix that comprises user rankings of catalog items in a catalog. Optionally, the CF-TGT vectors are generated at least in part by a neural network operating on information that characterizes frequencies with which items are associated. The neural network may comprise an item2vec neural network operating on pairs of the catalog items that are frequently associated to generate the CF-TGT vectors.

FIG. 2A schematically shows a movie MapNet 50 comprised in Janus 20 configured to recommend movies to a user 21, in accordance with an embodiment of the disclosure. The recommendations are made based on CB input data and CF-TGT vectors that Janus 20 generates for a query movie received by Janus 20 from the user.

Movie MapNet 50 may be trained by MapNet neural network trainer 40 in Janus 20 to receive CB input data that is associated with and characterizes a given movie, such as a movie identified in a query from a user 21, and generate a CB-SRC vector and therefrom a CF-TGT vector for the movie. Examples of CB input data comprise tags, numerical data, and movie descriptive text associated with the movie. Tags associated with a movie may comprise nomenclature identifying features of the movie, and may comprise by way of example, at least one or any combination of more than one of genre, a name of a director, a producer, and/or author of a story line of the movie. Numerical data may comprise by way of example, a release date of the movie, duration of the movie, and/or production cost of the movie. Descriptive text may comprise for example, a summary of a plot line of the movie.

By way of example movie MapNet 50 optionally comprises a plurality of six input mapping modules 51, 52, 53, 54, 55, and 56, and a CF-TGT generator module 60. Each input mapping module 51-56 receives a different type of CB input data associated with a query movie and maps the input data it receives to a CB component vector for input to CF-TGT generator module 60. CF-TGT generator module 60 receives the CB component vectors respectively generated by input mapping modules 51-56, concatenates the CB component vectors to form a CB-SRC vector 61, and processes the CB-SRC to generate a query CF-TGT for the movie.

In an embodiment input mapping modules 51-54 are tag data input modules that map different type of tag data to CB component vectors. Each Tag data input module comprises a neural network optionally having an input CB data layer and a single hidden layer fully connected to the input layer in which nodes generate outputs in accordance with a rectified linear unit (ReLU) activation function. The input layer of a given tag input module 51-54 is, optionally, a binary vector whose length in bits is equal to a number of different possible tags that the given tag input module may receive for the CB data that that the module maps. Each different tag input to the given tag input module may be represented in the input layer of the module by a different single bit encoded with a 1 with all the rest of the bits encoded with 0.

By way of example, tag input module 52 may be a Tag-Actor module that processes movie tag CB input data that identifies actors and actresses that act in a query movie. In an embodiment Tag-Actor module 52 may be configured to receive data identifying a movie's actors and actress from among about 1500 actors and actresses and may therefore have an input layer 52-1 comprising about 1500 nodes. For each actor or actress from the 1500 actors and actresses that might act in the query movie a different bit in input layer 52-1 may be set to one with the remainder of the bits set to 0. A query movie in which 10 of the 1500 actors and actresses appear in the query movie, 10 different bits in input layers 52-1 may therefore be set to 1 with the remaining 1490 bits set to zero. The Tag-Actor module may have a hidden layer 52-2 comprising 100 nodes fully connected to input layer 52-1 that generates an output CB component vector having dimension equal to 100. Tag input module 51 may be a Tag-Genre module that processes CB input data that identifies a movie's genre and may have an input layer 51-1 comprising about 23 nodes that define a 23 bit binary input vector, and an optionally fully connected hidden layer 51-2 that generates an output CB component vector having dimension equal to 100. Tag input module 53, may be a Tag-Director module that processes CB input data that identifies a movie's director and may have an input layer 53-1 comprising about 470 nodes that define a 470 bit binary input vector and an optionally fully connected hidden layer 53-2 that generates an output CB component vector having dimension equal to 40. Tag input module 54 may be a Tag-Language module that processes CB input data that identifies a movie's language from among 72 possible languages and may therefore have an input layer 54-1 comprising about 72 nodes that define a 72 bit binary input vector, and an optionally fully connected hidden layer 54-2 that generates an output CB component vector having dimension equal to 20.

CB data input module 56 may be a numerical module that receives numerical data 56-1 that by way of example comprises a release year of a movie, and presents the release year as a CB component vector 56-2 advantageously formatted for example as a binary or decimal number.

CB data input module 55 may comprise a bag of words (BOW) text, "BOW-Text", neural network module, which processes descriptive text associated with movies, for example descriptive text that describes plots of movies. Optionally, BOW-Text module 55 comprises an input layer 55-1, a hidden layer 55-2 fully connected with the input layer, and a second hidden layer 55-3 fully connected with hidden layer 55-2. Hidden layers 55-1 and 55-2 optionally have dimension 250.

BOW-Text module 55 may be configured to receive raw descriptive text of up to 500 words that summarizes the plot of a query movie. If the descriptive text comprises less than 500 words BOW-Text module 55 may pad the text with "blank" words to 500 words. BOW-Text module 55 may represent each word in the received "plot text" by a vector representing the word that is generated by training a word 2vec (w2v) neural network. A w2v neural network typically comprises a one hot input layer, a single hidden layer fully connected to the input layer and an output layer fully connected to the hidden layer. When provided a given word, a trained w2v neural network, generates probabilities for other words, which may be referred to as contextual words, in a document being in proximity to the given word. Training a w2v network comprises processing a corpus of training texts to generate sequences of words, for which at least one of the words from a natural, consecutive sequence of the words as they appear in the texts is deleted. Words in a text are conventionally referred to as "grams" and the sequences with the "missing" words are therefore conventionally often referred to as skip-grams. The skip-grams are used to train the w2v network to predict probabilities for contextual words for a given input word. The output weights of the trained hidden layer may be used as w2v vector representations of the input words. A w2v network may be trained using hierarchical softmax and/or negative sampling. BOW-Text module 55 processes the w2v representations of the words in the text using a k-means algorithm with soft alignment to cluster the w2v words into "b" clusters. The number of words in each cluster is, optionally, normalized to a total number of different words in the text to produce a probability histogram which provides values for input layer 55-1. An output vector having dimension 250 generated by hidden layer 55-3 for the plot text input to BOW-Text module 55 for the query movie is used as a CB component vector for input to generator module 60.

In an embodiment generator module 60 concatenates the CB component vectors that it receives from CB data input modules 51-56 to generate a CB-SRC vector at an input layer 61. For the CB component vectors provided by CB input modules 51-56, the input layer 61, and the CB-SRC vector has' have a dimension of about 515. Generator module 60 may process the CB-SRC vector using two fully connected hidden layers 62 and 63 to generate a query CF-TGT vector at the output of layer 63 for use in recommending movies to a user base, as discussed with reference to FIG. 1B.

Figure 2B:
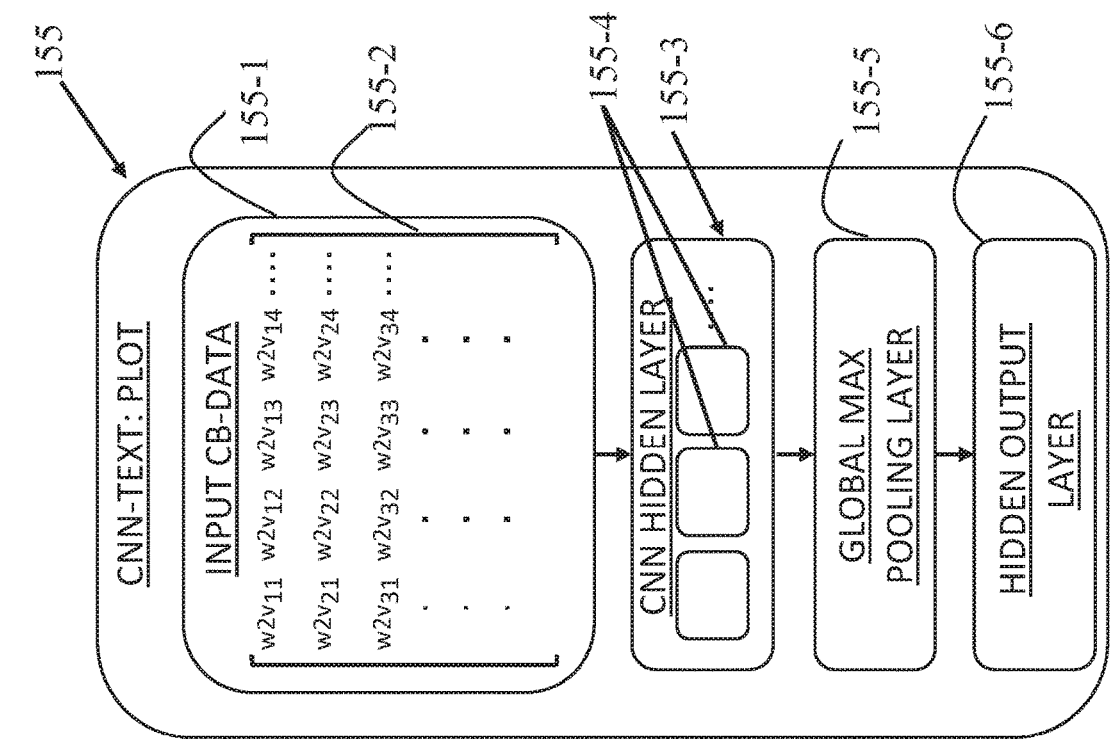
FIG. 2B shows a schematic of a module comprising a convolution neural network (CNN) that may be used by the MapNet shown in FIG. 2A to generate a CB vector for a movie in accordance with an embodiment of the disclosure.
Figure 2A:
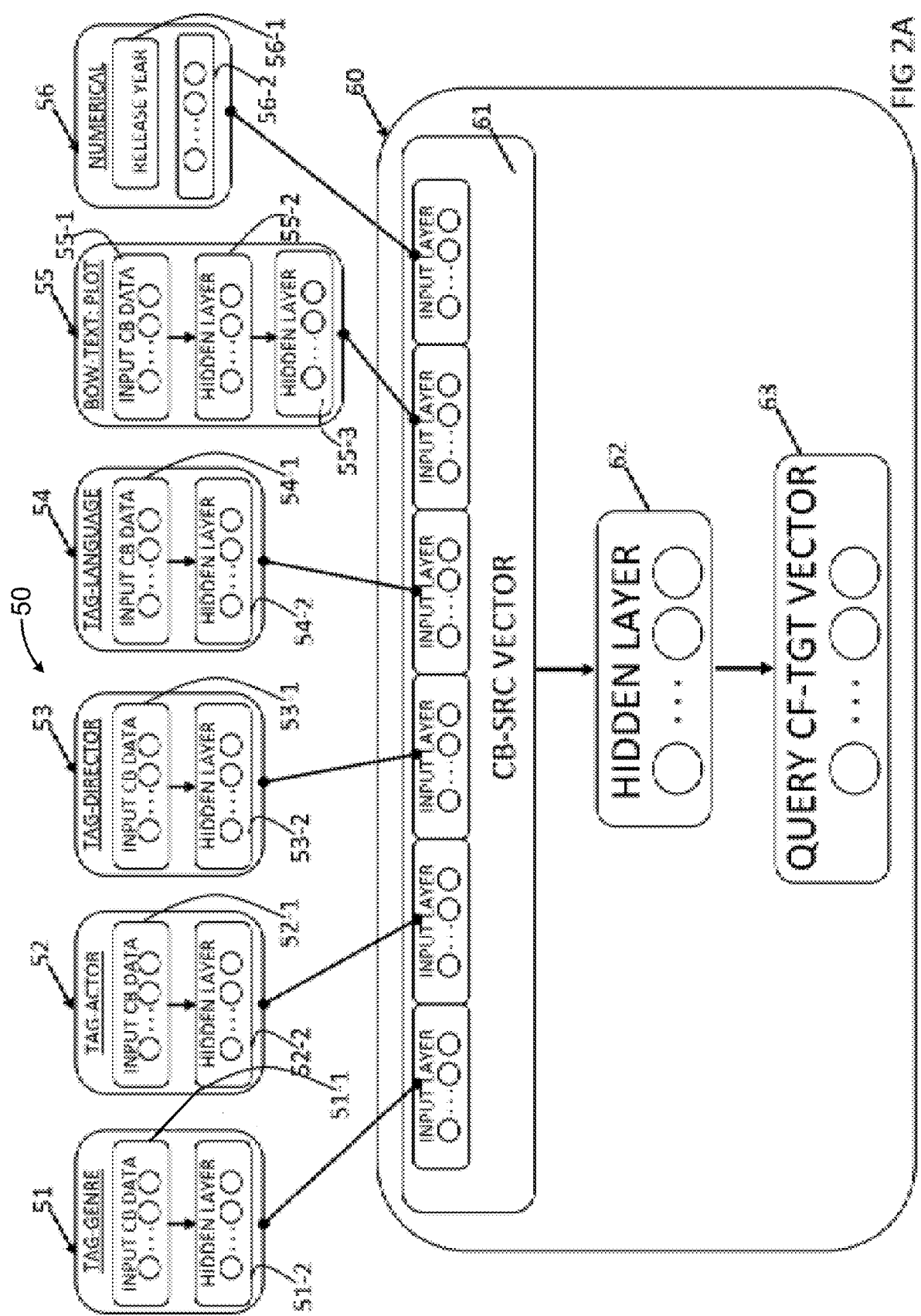
FIG. 2A shows a schematic of a MapNet that configures SRC vectors as CB vectors and TGT vectors as CF vectors that may be used by the Janus shown in FIGS. 1A and 1B to recommend movies to users, in accordance with an embodiment of the disclosure.

A MapNet 50 in accordance with an embodiment of the disclosure may comprise a convolution neural network text (CNN-Text) module 155 shown in FIG. 2B, in place of, or in addition to BOW-Text module 55 for processing a plot text of a query movie. Similarly to BOW-Text module 55, CNN-Text module 155 may be configured to receive a raw descriptive plot text of up to 500 words that summarizes the plot of a query movie and pad the received text with blank words if the plot text comprises less than 500 words. The CNN-Text module represents words in the received plot text by respective w2v vectors and in an input layer 155-1 arrays the vectors in a matrix 155-2 in which, optionally, a given row in the matrix comprises components from only one w2v vector. Optionally a sequential order of the w2v vectors by row in matrix 155-2 is the same as the sequential order of the words they represent in the plot text. For example, row one in matrix 155-2 comprises w2v components $w2v_{11}$, $w2v_{12}$, $w2v_{13}$ ... from the $w2v_1$ vector representing the first word in the plot text and the second and third rows comprise the components $w2v_{21}$, $w2v_{22}$, $w2v_{23}$ ... and $w2v_{31}$, $w2v_{32}$, $w2v_{33}$ ... respectively for $w2v_2$ and $w2v_3$ vectors representing the second and third words in the text. In an embodiment each w2v vector comprises 100 components so that matrix 155-2 has 500 rows and 100 columns.

CNN-Text module 155 uses a CNN layer 155-3 comprising a plurality of feature maps 155-4 to processes matrix 155-2. Optionally, the CNN layer comprises 300 feature maps each having a receptive field of length optionally equal to the number of elements in a row of matrix 155-2 and depth equal to a plurality of, optionally, three rows. For matrix 155-2, which as noted above has 500 rows of 100 elements, each, feature map 155-4 therefore has a 3×100 receptive field and generates a vector having 498 components. A global max pooling layer 155-5 may pool the 498 components of the output vector that each feature map generates to extract a maximum component from the components. The max pooling layer presents the maximum components of the 300 feature map vectors as a 300 component input vector to a fully connected hidden layer 155-6 having an output which provides a CB component vector for CF-TGT generator module 60.

MapNet 50 is optionally trained on a training set of CF-TGT vectors from database 31 so that given an input comprising the Tag data, numerical data, and plot text for a movie in the database having a CF-TGT vector in the training set, MapNet 50 generates a CF-TGT vector that approximates the movie's CF-TGT vector in the database to a degree that satisfies a suitable similarity criterion. In an embodiment MapNet 50 may be trained to minimize a Mean Square Error cost function for CF-TGT target vectors that MapNet 50 generates relative to the training CF-TGT vectors. The CF-TGT training vectors in database 31 may be generated by any suitable algorithm that maps movies to vectors that reflect CF relationships between the movies. For example, a set of training CF-TGT vectors may be generated by matrix factorization of a ranking matrix in which movies are rated by users or ranked by attendance at or purchase of movies.

In an embodiment, training CF-TGT vectors for movies are generated by a Skip Gram with Negative Sampling (SGNS) type neural network referred to as "item2vec". Item2vec operates on catalog items rather than words to generate CF vectors which represent catalog items based on frequencies with which the catalog items are associated. For items that are movies, item2vec may operate on movies in a database of movies ranked by users to generate CF vectors representing the movies similarly to the way in which word2vec operates on text to generate vectors representing the words in the text. A set of movies from the database that are assigned ranks greater than a predetermined threshold rank by a same user may be considered to be a set of co-occurring movies, optionally referred to as a "movie string", analogous to a sequence of words in a text on which word2vec operates. Optionally, the set of co-occurring movies ranked by the user is an ordered set ordered by sequence in which the movies were watched or purchased by the user. Item2vec processes original strings of movies provided by many users to generate movie strings, "skip-movie strings" for which at least one of the movies appearing in the original strings is deleted. Item2vec may be trained on the skip-movie strings similarly to the way in which word2vec trains on skip-grams to generate vector representations of the movies that function as CF-TGT vectors for the movies.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A method of recommending items to a user, the method comprising:
   identifying a first feature vector in a first vector space representing items based on first characteristics of the items, the first feature vector representing words in a text describing an item, the first feature vector being created by a word to vector neural network;
   identifying a second feature vector in a second vector space representing items in a catalog based on second characteristics of each item, the second feature vector representing catalog items, the second feature vector being created by an item to vector neural network based on frequencies of association of the items in the catalog;
   using a convolution neural network to map the first feature vector to the second feature vector in the second vector space, wherein the convolution neural network is trained on a plurality of training items having known characteristics and vectors to generate vectors responsive to the known characteristics that satisfy a cost function criterion; and using a relationship between the second feature vector to another second feature vector in the second vector space representing another item to determine whether or not to recommend the other item to the user.

2. The method according to claim 1, wherein the first characteristics are content based characteristics and the second characteristics are collaborative filter characteristics.

3. The method according to claim 1, wherein the known characteristics comprise a known first characteristic, wherein the vectors comprises a known second vector, and wherein the plurality of training items have the known first characteristics and the known second vector to generate second vectors responsive to the known first characteristics.

4. The method according to claim 3, wherein generating the second vectors responsive to the known first characteristics further comprises generating the second vectors responsive to the known first characteristics that satisfy the cost function criterion.

5. The method according to claim 4, wherein the known first characteristics comprise content based (CB) characteristics.

6. The method according to claim 5, wherein the CB characteristics comprise text descriptive of the items.

7. The method according to claim 6, wherein the word to vector neural network represents words in the descriptive text by word to vector (word2vec) vectors.

8. The method according to claim 7, wherein the word to vector neural network uses the word2vc vectors to process the descriptive text as a bag of words (BOW).

9. The method according to claim 7, wherein the word to vector neural network arrays the word2vec vectors in a matrix by sequence of appearance of the words they represent in the descriptive text.

10. The method according to claim 9, wherein the word to vector neural network processes the matrix with the convolution neural network.

11. The method according to claim 1, wherein the item to vector neural network arrays vectors in a matrix by an order of the items.

12. The method according to claim 11, wherein the order of the items is based on rank or a time an action on an item was taken by a user.

13. A recommender system for recommending an item to a user, the recommender system comprising:
 a database comprising a plurality of catalog items characterized by first characteristics and different second characteristics and having second feature vectors in a second vector space that represent the catalog items based on the respective second characteristics of the catalog items; and
 a processor configured to:
  identify a first feature vector in a first vector space representing items based on first characteristics for an item, the first feature vector representing words in a text describing an item, the first feature vector being created by a word to vector neural network;
  identify a second feature vector in a second vector space representing items in a catalog based on second characteristics of each item, the second feature vector representing catalog items, the second feature vector being created by an item to vector neural network based on frequencies of association of the items in the catalog;
  generate a first feature vector in a first vector space different from the second vector space based on the received first characteristics;
  use a convolution neural network to map the generated first feature vector to the second feature vector for the item in the second vector space, wherein the convolution neural network is trained on a plurality of training items having known characteristics and vectors to generate vectors responsive to the known characteristics that satisfy a cost function criterion; and
  use the mapped second feature vector and second feature vectors representing items in the catalog to recommend an item from the catalog to the user.

14. The system according to claim 13, wherein the first characteristics are content based characteristics and the second characteristics are collaborative filter characteristics.

15. The system according to claim 13, wherein the known characteristics comprise a known first characteristic, wherein the vectors comprises a known second vector, and wherein the plurality of training items have the known first characteristics and the known second vector to generate second vectors responsive to the known first characteristics.

16. The system according to claim 15, wherein generating the second vectors responsive to the known first characteristics further comprises generating the second vectors responsive to the known first characteristics that satisfy the cost function criterion.

17. The system according to claim 16, wherein the first characteristics comprise content based (CB) characteristics.

18. A computer-readable storage device comprising computer-executable instructions that, when executed by one or more processors, cause the one or more processors to perform operations comprising:
 identifying a first feature vector in a first vector space representing items based on first characteristics of an item, the first feature vector representing words in a text describing an item, the first feature vector being created by a word to vector neural network;
 identifying a second feature vector in a second vector space representing items in a catalog based on second characteristics of each item, the second feature vector representing catalog items, the second feature vector being created by an item to vector neural network based on frequencies of association of the items in the catalog;
 using a convolution neural network to map the first feature vector to the second feature vector in the second vector space, wherein the convolution neural network is trained on a plurality of training items having known characteristics and vectors to generate vectors responsive to the known characteristics that satisfy a cost function criterion; and
 using a relationship between the second feature vector to another second feature vector in the second vector space representing another item to determine whether or not to recommend the other item to the user.

19. The computer-readable storage device of claim 18, wherein the first characteristics are content based characteristics and the second characteristics are collaborative filter characteristics.

20. The computer-readable storage device of claim 18, wherein the known characteristics comprise a known first characteristic, wherein the vectors comprises a known second vector, and wherein the plurality of training items have the known first characteristics and the known second vector to generate second vectors responsive to the known first characteristics.

* * * * *